(12) United States Patent
Heresztyn et al.

(10) Patent No.: US 10,014,733 B2
(45) Date of Patent: Jul. 3, 2018

(54) TEMPERATURE MANAGEMENT IN A WIRELESS ENERGY TRANSFER SYSTEM

(71) Applicant: Apple Inc., Cupertino, CA (US)

(72) Inventors: Amaury J. Heresztyn, Cupertino, CA (US); Keith Cox, Cupertino, CA (US); Eric S. Jol, Cupertino, CA (US); Jeffrey M. Alves, Cupertino, CA (US); Jim C. Hwang, Cupertino, CA (US); Jeffrey J. Terlizzi, Cupertino, CA (US); John M. Ananny, Cupertino, CA (US); Nagarajan Kalyanasundaram, Cupertino, CA (US); Robert S. Parnell, Cupertino, CA (US); Steven G. Herbst, Cupertino, CA (US); Todd K. Moyer, Cupertino, CA (US); Albert J. Golko, Cupertino, CA (US); Frank Liang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 245 days.

(21) Appl. No.: 14/837,965

(22) Filed: Aug. 27, 2015

(65) Prior Publication Data
US 2016/0064948 A1 Mar. 3, 2016

Related U.S. Application Data

(60) Provisional application No. 62/043,162, filed on Aug. 28, 2014.

(51) Int. Cl.
*H02J 50/80* (2016.01)
*H02J 50/10* (2016.01)
*H02J 7/02* (2016.01)

(52) U.S. Cl.
CPC .............. *H02J 50/80* (2016.02); *H02J 50/10* (2016.02); *H02J 7/025* (2013.01)

(58) Field of Classification Search
CPC ............. H02J 50/80; H02J 50/10; H02J 7/025
USPC .................................. 307/98–11, 98–111; 1/1
See application file for complete search history.

(56) References Cited

U.S. PATENT DOCUMENTS

| | | |
|---|---|---|
| 4,268,899 A | 5/1981 | Rokas |
| 5,293,308 A | 3/1994 | Boys et al. |
| 5,639,989 A | 6/1997 | Higgins, III |
| 6,960,968 B2 | 11/2005 | Odenaal et al. |
| 6,972,543 B1 | 12/2005 | Wells |
| 7,641,358 B1 | 1/2010 | Smith et al. |

(Continued)

FOREIGN PATENT DOCUMENTS

| | | |
|---|---|---|
| CN | 1826715 | 8/2006 |
| CN | 101243374 | 8/2006 |

(Continued)

OTHER PUBLICATIONS

U.S. Appl. No. 15/393,435, filed Dec. 29, 2016, Bossetti et al.

(Continued)

*Primary Examiner* — Brandon S Cole
(74) *Attorney, Agent, or Firm* — Brownstein Hyatt Farber Schreck, LLP

(57) ABSTRACT

Various techniques for temperature management during inductive energy transfer are disclosed. A transmitter device and/or a receiver device can be turned off during energy transfer based on the temperature of the transmitter device and/or of the receiver device.

20 Claims, 10 Drawing Sheets

(56) References Cited

U.S. PATENT DOCUMENTS

| | | | |
|---|---|---|---|
| 7,893,564 B2 | 2/2011 | Bennett | |
| 7,948,208 B2 | 5/2011 | Partovi et al. | |
| 7,952,322 B2 | 5/2011 | Partovi et al. | |
| 8,024,491 B1 | 9/2011 | Wright et al. | |
| 8,054,651 B2 | 11/2011 | Pollard | |
| 8,169,151 B2 | 5/2012 | Kimura | |
| 8,169,185 B2 | 5/2012 | Partovi et al. | |
| 8,274,178 B2 | 9/2012 | Tucker | |
| 8,278,784 B2 | 10/2012 | Cook | |
| 8,329,376 B2 | 11/2012 | Kitamura et al. | |
| 8,362,744 B2 | 1/2013 | Terao et al. | |
| 8,421,274 B2 | 4/2013 | Son et al. | |
| 8,446,046 B2 | 5/2013 | Fells et al. | |
| 8,629,652 B2 | 1/2014 | Partovi et al. | |
| 8,629,654 B2 | 1/2014 | Partovi et al. | |
| 8,663,106 B2 * | 3/2014 | Stivoric | A61B 5/0008 374/164 |
| 8,810,071 B2 | 8/2014 | Sauerlaender et al. | |
| 8,853,892 B2 | 10/2014 | Fells et al. | |
| 8,884,469 B2 | 11/2014 | Lemmens | |
| 8,890,470 B2 | 11/2014 | Partovi et al. | |
| 8,896,264 B2 | 11/2014 | Partovi | |
| 8,901,881 B2 | 12/2014 | Partovi et al. | |
| 8,922,525 B2 | 12/2014 | Chen et al. | |
| 8,947,047 B2 | 2/2015 | Partovi et al. | |
| 9,018,904 B2 | 4/2015 | Seyerle et al. | |
| 9,030,421 B2 | 5/2015 | Tseng et al. | |
| 9,093,857 B2 | 7/2015 | Sakai et al. | |
| 9,099,885 B2 | 8/2015 | Kamata | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,124,112 B2 | 9/2015 | Havass et al. | |
| 9,126,490 B2 | 9/2015 | Cook | |
| 9,148,201 B2 | 9/2015 | Kallal et al. | |
| 9,154,189 B2 | 10/2015 | Von Novak et al. | |
| 9,160,180 B2 | 10/2015 | Suzuki et al. | |
| 9,178,369 B2 | 11/2015 | Partovi | |
| 9,197,065 B2 | 11/2015 | Divan et al. | |
| 9,197,070 B2 | 11/2015 | Jung | |
| 9,231,411 B2 | 1/2016 | Baarman et al. | |
| 9,270,138 B2 | 2/2016 | Yamakawa et al. | |
| 9,276,437 B2 | 3/2016 | Partovi et al. | |
| 9,318,915 B2 | 4/2016 | Miller et al. | |
| 9,352,661 B2 | 5/2016 | Keeling et al. | |
| 9,356,659 B2 | 5/2016 | Partovi | |
| 9,407,107 B2 | 8/2016 | Park et al. | |
| 9,460,846 B2 | 10/2016 | Graham et al. | |
| 9,496,731 B2 | 11/2016 | Park et al. | |
| 9,509,374 B2 | 11/2016 | Kim et al. | |
| 9,537,363 B2 | 1/2017 | Bossetti et al. | |
| 9,685,814 B1 | 6/2017 | Moyer et al. | |
| 9,800,076 B2 | 10/2017 | Jadidian et al. | |
| 9,813,041 B1 | 11/2017 | Ritter | |
| 2001/0044588 A1 * | 11/2001 | Mault | A61B 5/0002 600/549 |
| 2008/0284609 A1 * | 11/2008 | Rofougaran | G01K 1/024 340/584 |
| 2010/0328044 A1 | 12/2010 | Waffenschmidt et al. | |
| 2011/0050164 A1 | 3/2011 | Partovi et al. | |
| 2011/0109264 A1 | 5/2011 | Choi | |
| 2011/0136550 A1 | 6/2011 | Maugars | |
| 2011/0198937 A1 | 8/2011 | Tseng | |
| 2011/0221385 A1 | 9/2011 | Partovi | |
| 2011/0234012 A1 | 9/2011 | Yi et al. | |
| 2011/0241615 A1 | 10/2011 | Yeh | |
| 2011/0254379 A1 | 10/2011 | Madawala | |
| 2011/0302078 A1 * | 12/2011 | Failing | B60L 3/00 705/39 |
| 2012/0068550 A1 | 3/2012 | De Boer et al. | |
| 2012/0169139 A1 | 7/2012 | Kudo | |
| 2012/0255039 A1 * | 10/2012 | Sipes | G06F 11/1456 726/35 |
| 2012/0313577 A1 | 12/2012 | Moes et al. | |
| 2013/0063160 A1 | 3/2013 | Nakano et al. | |
| 2013/0076648 A1 | 3/2013 | Krah et al. | |
| 2013/0093388 A1 | 4/2013 | Partovi | |
| 2013/0099563 A1 | 9/2013 | Partovi et al. | |
| 2013/0257168 A1 | 10/2013 | Singh | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2013/0334326 A1 * | 12/2013 | Shan | G08C 17/02 236/51 |
| 2014/0015327 A1 | 1/2014 | Keeling et al. | |
| 2014/0015522 A1 | 1/2014 | Widmer et al. | |
| 2014/0035378 A1 | 2/2014 | Kesler et al. | |
| 2014/0103873 A1 | 4/2014 | Partovi et al. | |
| 2014/0129010 A1 * | 5/2014 | Garg | H04R 1/1016 700/94 |
| 2014/0132210 A1 | 5/2014 | Partovi | |
| 2014/0159501 A1 * | 6/2014 | Kanno | H02J 17/00 307/104 |
| 2014/0159656 A1 | 6/2014 | Riehl | |
| 2014/0191568 A1 | 7/2014 | Partovi | |
| 2014/0191818 A1 | 7/2014 | Waffenschmidt et al. | |
| 2014/0197687 A1 | 7/2014 | Lin | |
| 2014/0197782 A1 | 7/2014 | Graf et al. | |
| 2014/0225439 A1 | 8/2014 | Mao | |
| 2014/0266018 A1 | 9/2014 | Carobolante | |
| 2014/0285141 A1 * | 9/2014 | Lee | H02J 7/025 320/108 |
| 2014/0306654 A1 | 10/2014 | Partovi | |
| 2014/0327409 A1 * | 11/2014 | Lee | H02J 7/025 320/137 |
| 2014/0347007 A1 | 11/2014 | Kee et al. | |
| 2015/0001950 A1 | 1/2015 | Chung et al. | |
| 2015/0035372 A1 | 2/2015 | Aioanei | |
| 2015/0077045 A1 | 3/2015 | Harris | |
| 2015/0280455 A1 | 3/2015 | Bosshard et al. | |
| 2015/0130412 A1 | 5/2015 | Partovi | |
| 2015/0207333 A1 | 7/2015 | Baarman et al. | |
| 2015/0215006 A1 | 7/2015 | Mehas et al. | |
| 2015/0244179 A1 | 8/2015 | Ritter et al. | |
| 2015/0244341 A1 | 8/2015 | Ritter et al. | |
| 2015/0270058 A1 | 9/2015 | Golko et al. | |
| 2015/0333530 A1 | 11/2015 | Moyer et al. | |
| 2015/0349538 A1 | 12/2015 | Agostinelli et al. | |
| 2015/0364931 A1 | 12/2015 | Ren et al. | |
| 2016/0043567 A1 | 2/2016 | Matumoto et al. | |
| 2016/0056664 A1 | 2/2016 | Partovi | |
| 2016/0064992 A1 | 3/2016 | Herbst et al. | |
| 2016/0127672 A1 * | 5/2016 | Kamide | G06K 9/4604 348/223.1 |
| 2016/0172894 A1 | 6/2016 | Khripkov et al. | |
| 2016/0181849 A1 * | 6/2016 | Govindaraj | H02J 7/025 320/108 |
| 2016/0261137 A1 | 9/2016 | Riehl | |
| 2016/0285278 A1 | 9/2016 | Mehas et al. | |
| 2017/0012463 A1 | 1/2017 | Lynch | |
| 2017/0089959 A1 * | 3/2017 | Ito | G01R 22/063 |
| 2017/0110911 A1 | 4/2017 | Bossetti et al. | |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102124624 | 7/2011 |
| CN | 102257696 | 11/2011 |
| CN | 102355035 | 2/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |

(56) References Cited

FOREIGN PATENT DOCUMENTS

| | | |
|---|---|---|
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| EP | 1633122 | 8/2005 |
| EP | 2642628 | 9/2013 |
| GB | 2484999 | 5/2012 |
| JP | H08149608 | 6/1996 |
| JP | H08331850 | 12/1996 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014193087 | 10/2014 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/122625 | 8/2013 |
| WO | WO 16/024869 | 2/2016 |

OTHER PUBLICATIONS

U.S. Appl. No. 15/467,998, filed Mar. 23, 2017, Bentov et al.
U.S. Appl. No. 15/468,001, filed Mar. 23, 2017, Qiu et al.
Office Action dated Nov. 18, 2015, CN 201520662235.7, 7 pages.
U.S. Appl. No. 14/628,897, filed Feb. 23, 2015, Ritter et al.
U.S. Appl. No. 14/627,957, filed Feb. 20, 2015, Ritter et al.
U.S. Appl. No. 14/795,723, filed Jul. 9, 2015, Herbst et al.
U.S. Appl. No. 15/179,922, filed Jun. 10, 2016, Lynch.

\* cited by examiner

TEMPERATURE MANAGEMENT IN A WIRELESS ENERGY TRANSFER SYSTEM

CROSS-REFERENCE TO RELATED APPLICATION

This application claims the benefit under 35 U.S.C. § 119(e) of U.S. Provisional Patent Application No. 62/043,162, filed on Aug. 28, 2014, and entitled "Temperature Management in a Wireless Energy Transfer System," which is incorporated by reference as if fully disclosed herein.

FIELD

The invention relates generally to wireless power transfer systems, and more particular to techniques for temperature management in a wireless energy transfer system.

BACKGROUND

Many electronic devices include one or more rechargeable batteries that require external power to recharge from time to time. Often, these devices may be charged using a similar power cord or connector, for example a universal serial bus ("USB") connector. However, despite having common connection types, devices often require separate power supplies with different power outputs. These multiple power supplies can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive charging device. The user may simply place the electronic device on an inductive charging surface of a charging device in order to transfer energy from the charging device to the electronic device. The charging device transfers energy to the electronic device through inductively coupling between a transmitter coil in the charging device and a receiver coil in the electronic device. Unfortunately, inductive charging can be adversely affected by power losses, which reduce the efficiency of the energy transfer. The conversion of energy into heat during the energy transfer process contributes to the power losses. The temperature of the charging device or of the electronic device can increase as a result of the heat produced during the energy transfer. At some point, the temperature of the charging device and/or of the electronic device can increase to a level that might be uncomfortable for human contact or otherwise undesirable.

SUMMARY

In one aspect, a method for operating an inductive energy transfer system that includes a transmitter device and a receiver device can include determining if a temperature of the transmitter or receiver device is equal to or greater than a first temperature threshold during energy transfer. If the temperature is equal to or greater than the first temperature threshold, the transmitter device may be turned off. A determination can then be made as to whether or not the temperature of the transmitter device is equal to or less than a second temperature threshold. If the temperature is equal to or less than the second temperature threshold, the transmitter device may be turned on. Once on, the transmitter device can communicate with the receiver device, begin transferring energy to the receiver device, and/or perform a security or authentication process with the receiver device.

In another aspect, if a temperature of the transmitter or receiver device is equal to or greater than a first temperature threshold during energy transfer, the transmitter device may be turned off for a given period of time. At the end of the given period of time, the transmitter device is turned on. The period of time can be a fixed period of time or an adjustable period of time. The period of time may be adjustable based on one or more factors, such as prior thermal management actions, the difference between the current temperature and the first threshold value, and/or a communication signal received from the receiver device.

In another aspect, the transmitter device may be turned off based on a communication received from the receiver device.

In another aspect, a photoplethysmogram sensor in the receiver device may be turned on (e.g., activated) when the receiver device is on an inductive charging surface of the transmitter device and used to determine a presence or absence of the transmitter device.

In yet another aspect, during energy transfer a receiver device can receive temperature data from the transmitter device. The receiver device may then determine whether the transmitter device should be turned off. If the transmitter device should be turned off, the receiver device can communicate with the transmitter device and instruct the transmitter device to turn off. The transmitter device may be turned off until a temperature of the transmitter device equals or is less than a threshold value. Additionally or alternatively, the transmitter device may be turned off for a fixed or adjustable period of time.

In another aspect, a transmitter device in an inductive energy transfer system can include one or more temperature sensors and one or more network communication interfaces. A receiver device may include one or more network communication interfaces and a processing device. A network communication interface in the transmitter device may be configured to transmit temperature data obtained from the temperature sensor(s) to a network communication interface in the receiver device. The processing device in the receiver device can be configured to receive the temperature data and determine whether the transmitter device should be turned off.

In another aspect, a transmitter device in an inductive energy transfer system can include a first temperature sensor, a first network communication interface, and a first processing device. A receiver device may include a second network communication interface, a second temperature sensor, and a second processing device. During energy transfer, the first network communication interface is configured to transmit temperature data obtained from the temperature sensor to the second network communication interface and the second processing device is configured to determine whether a temperature of the transmitter device is equal to or greater than a temperature threshold. If the temperature is equal to or greater than the temperature threshold, the second processing device is configured to transmit a communication signal from a third network communication interface in the receiver device to a fourth network communication interface in the transmitter device and the first processing device is configured to turn off the transmitter device for a given period of time based on the communication signal. In some embodiments, the second and third network communication interfaces can be the same network communication interface, and the first and fourth network communication interfaces may be the same network communication interface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein provide techniques for temperature management during inductive energy transfer. A transmitter device and/or a receiver device can be turned off during energy transfer when the temperature in the device, or the temperature of a component in the device, becomes too high. For example, the transmitter device can be turned off when the temperature equals or exceeds a given temperature threshold value. Some of the embodiments discussed herein provide techniques for determining when the transmitter device is to be turned back on. Additionally, in some embodiments, the receiver device may determine if the transmitter device is off or is not present. As used herein, the terms "energy", "signal", or "signals" are meant to encompass transferring energy for wireless charging, transferring energy as communication and/or control signals, or both wireless charging and the transmission of communication and/or control signals.

These and other embodiments are discussed below with reference to FIGS. 1-16. However, those skilled in the art will readily appreciate that the detailed description given herein with respect to these Figures is for explanatory purposes only and should not be construed as limiting.

Figure 1:
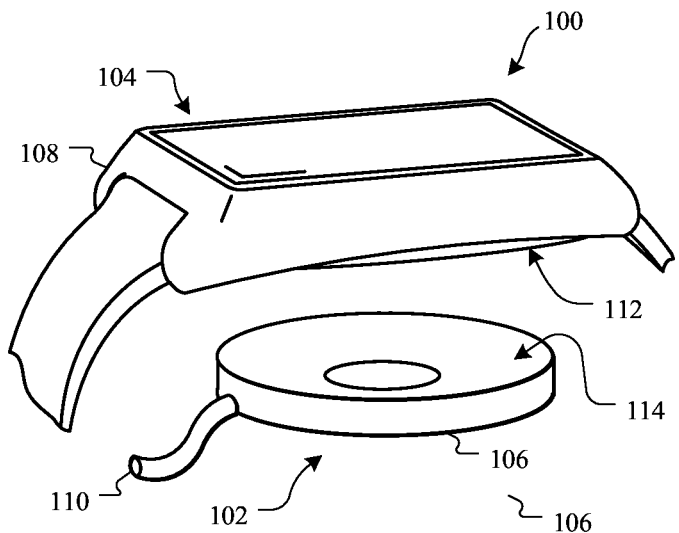
FIG. 1 illustrates one example of an inductive energy transfer system in an unmated configuration.

Referring now to FIG. 1, there is shown a perspective view of one example of an inductive energy transfer system in an unmated configuration. The illustrated embodiment depicts a transmitter device 102 that is configured to wirelessly transfer energy to a receiver device 104. The receiver device 104 can be any electronic device that includes one or more inductors. Example electronic devices include, but are not limited to, a portable electronic device or a wearable communication device.

The wearable communication device, such as the one depicted in FIG. 1, may be configured to provide health-related information or data to a user and/or to an associated device. As one example, the health-related information can include, but is not limited to, heart rate data, blood pressure data, temperature data, oxygen level data, diet/nutrition information, medical reminders, health-related tips or information, or other health-related data. The associated monitoring device may be, for example, a tablet computing device, a smart telephone, a personal digital assistant, a computer, and so on.

A wearable communication device may include a coupling mechanism to connect a strap or band to a user. For example, a smart watch may include a band or strap to secure to a user's wrist. In another example, a wearable health assistant may include a strap to connect around a user's chest, or alternately, a wearable health assistant may be adapted for use with a lanyard or necklace. In still further examples, a wearable device may secure to or within another part of a user's body. In these and other embodiments, the strap, band, lanyard, or other securing mechanism may include one or more electronic components or sensors in wireless or wired communication with the communication device. For example, the band secured to a smart watch may include one or more sensors, an auxiliary battery, a camera, or any other suitable electronic component.

In many examples, a wearable communication device, such as the one depicted in FIG. 1, may include a processor coupled with, or in communication with a memory, one or more communication interfaces, output devices such as displays and speakers, one or more sensors, such as biometric and imaging sensors, and input devices such as one or more buttons, one or more dials, a microphone, and/or a touch sensing device. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable communication device may provide information regarding time, health, statuses or externally connected or communicating devices and/or software executing on such devices, messages, video, operating commands, and so forth (and may receive any of the foregoing from an external device), in addition to communications.

Figure 2:
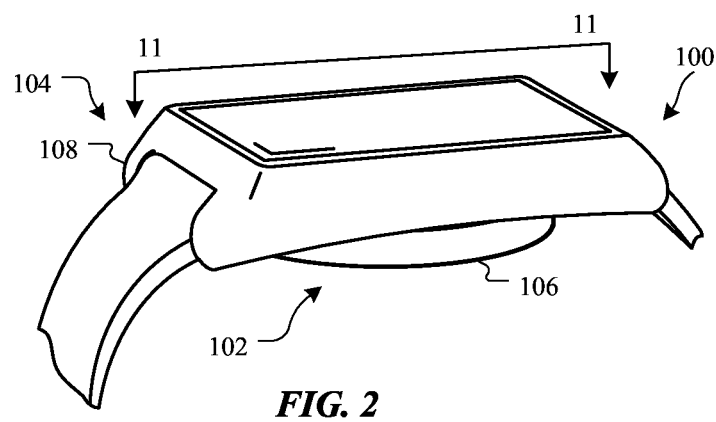
FIG. 2 depicts the inductive energy transfer system 100 in a mated configuration.

Although the wearable communication device illustrated in FIGS. 1 and 2 depicts a wristwatch or smart watch, any electronic device may be suitable to receive energy inductively from a transmitter device. For example, a suitable electronic device may be any portable or semi-portable electronic device that may receive energy inductively ("receiver device"), and a suitable dock device may be any portable or semi-portable docking station or charging device that may transmit energy inductively ("transmitter device").

The transmitter device 102 and the receiver device 104 may each respectively include a housing 106, 108 to enclose electronic, mechanical and structural components therein. In many examples, and as depicted, the receiver device 104 may have a larger lateral cross section than that of the transmitter device 102, although such a configuration is not required. In other examples, the transmitter device 102 may have a larger lateral cross section than that of the receiver device 104. In still further examples, the cross sections may be substantially the same. And in other embodiments, the transmitter device can be adapted to be inserted into a charging port in the receiver device.

In the illustrated embodiment, the transmitter device 102 may be connected to a power source by cord or connector 110. For example, the transmitter device 102 can receive power from a wall outlet, or from another electronic device through a connector, such as a USB connector. Additionally or alternatively, the transmitter device 102 may be battery operated. Similarly, although the illustrated embodiment is shown with the connector 110 coupled to the housing of the transmitter device 102, the connector 110 may be connected by any suitable means. For example, the connector 110 may be removable and may include a connector that is sized to fit within an aperture or receptacle opened within the housing 106 of the transmitter device 102.

The receiver device 104 may include a first interface surface 112 that may interface with, align or otherwise contact a second interface surface 114 of the transmitter device 102. In this manner, the receiver device 104 and the transmitter device 102 may be positionable with respect to each other. In certain embodiments, the second interface surface 114 of the transmitter device 102 may be configured in a particular shape that mates with a complementary shape of the receiver device 104 (see FIG. 2). The illustrative second interface surface 114 may include a concave shape that follows a selected curve. The first interface surface 112 of the receiver device 104 may include a convex shape following the same or substantially similar curve as the second interface surface 114.

In other embodiments, the first and second interface surfaces 112, 114 can have any given shape and dimension. For example, the first and second interface surfaces 112, 114 may be substantially flat. Additionally or alternatively, the transmitter and receiver devices 102, 104 can be positioned with respect to each other using one or more alignment mechanisms. As one example, one or more magnetic devices may be included in the transmitter and/or receiver devices and used to align the transmitter and receiver devices. In another example, one or more actuators in the transmitter and/or receiver devices can be used to align the transmitter and receiver devices. And in yet another example, alignment features, such as protrusions and corresponding indentations in the housings of the transmitter and receiver devices, may be used to align the transmitter and receiver devices. The design or configuration of the interface surfaces, one or more alignment mechanisms, and one or more alignment features can be used individually or in various combinations thereof.

Figure 3:
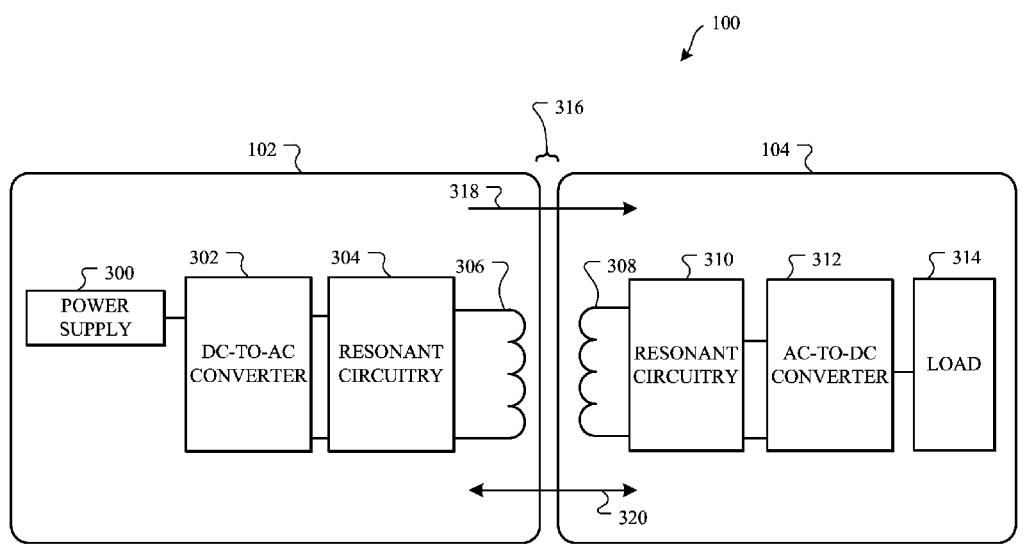
FIG. 3 depicts a simplified block diagram of one example of the inductive energy transfer system 100 shown in FIG. 1.

Referring now to FIG. 3, there is shown a simplified block diagram of one example of the inductive energy transfer system 100 shown in FIG. 1. The transmitter device 102 includes a power supply 300 operably connected to a DC-to-AC converter 302. Any suitable type of DC-to-AC converter may be used. For example, the DC-to-AC converter can be constructed as an H bridge in one embodiment. The DC-to-AC converter 302 is operatively connected to transmitter resonant circuitry 304. The transmitter resonant circuitry 304 is operatively connected to a transmitter coil 306.

The receiver device 104 can include a receiver coil 308 operably connected to receiver resonant circuitry 310. The receiver resonant circuitry 310 is operatively connected to an AC-to-DC converter 312. Any suitable type of AC-to-DC converter may be used. For example, the AC-to-DC converter can be constructed as a diode bridge in one embodiment.

A load 314 is operably connected to the output of the AC-to-DC converter 312. The load 314 is a rechargeable battery in one embodiment. A different type of load can be used in other embodiments.

The transmitter coil 306 and the receiver coil 308 together form a transformer 316. The transformer 316 transfers power or energy through inductive coupling between the transmitter coil 306 and the receiver coil 308 (energy transfer represented by arrow 318). Essentially, energy is transferred from the transmitter coil 306 to the receiver coil 308 through the creation of a varying magnetic flux by the AC signal in the transmitter coil 306 that induces a current in the receiver coil 308. The AC signal induced in the receiver coil 308 is received by the AC-to-DC converter 312 that converts the AC signal into a DC signal. In embodiments where the load 314 is a rechargeable battery, the DC signal is used to charge the battery. Additionally or alternatively, the transferred energy can be used to transmit communication signals to or from the receiver device (communication signals represented by arrow 320). Thus, the transmitter and receiver coils can each be considered a network communication interface and energy transfer between the transmitter and receiver devices can be a communication signal.

Figure 4:
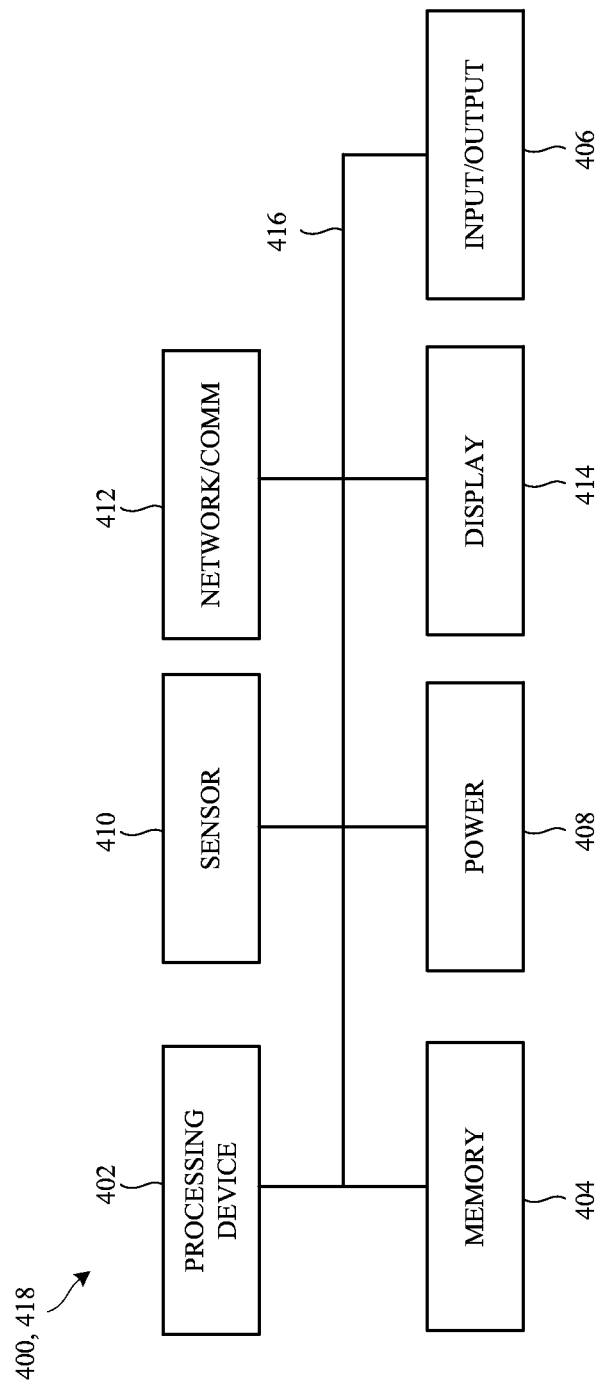
FIG. 4 illustrates a simplified block diagram of an example device suitable for use as a receiver device or a transmitter device.

The transmitter device and the receiver device can each include a number of internal components. FIG. 4 illustrates a simplified block diagram of one example receiver device. The receiver device 400 can include one or more processors 402, storage or memory 404, one or more input/output devices 406, a power source 408, one or more sensors 410, a network communication interface 412, and a display 414, each of which will be discussed in turn below.

The one or more processors 402 can control some or all of the operations of the transmitter device or receiver device. The processor(s) 402 can communicate, either directly or indirectly, with substantially all of the components of the device. For example, one or more system buses 416 or other communication mechanisms can provide communication between the processor(s) 402, the memory 404, input/output interface 406, a power source 408, one or more sensors 410, a network communication interface 412, and a display 414. The processor(s) 402 can be implemented as any electronic device capable of processing, receiving, or transmitting data or instructions. For example, the one or more processors 402 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 404 can store electronic data that can be used by the receiver device 400. For example, the memory 404 can store electrical data or content such as, for example, audio files, document files, timing and control signals, and image data. The memory 404 can be configured as any type of memory. By way of example only, memory 404 can be implemented as random access memory, read-only memory, Flash memory, removable memory, or other types of storage elements, in any combination.

The one or more I/O devices 406 can transmit and/or receive data to and from a user or another electronic device. Example I/O device(s) 406 include, but are not limited to, a touch sensing input device such as a touchscreen or track pad, one or more buttons, a microphone, and/or a speaker.

The power source 408 can be implemented with any device capable of providing energy to the receiver device. For example, the power source 408 can be one or more batteries or rechargeable batteries, or a connection cable that connects the remote control device to another power source such as a wall outlet.

The receiver device 400 may also include one or more sensors 410 positioned substantially anywhere on or in the receiver device 400. The sensor or sensors 410 may be configured to sense substantially any type of characteristic, such as but not limited to, images, pressure, light, touch, temperature, heat, movement, relative motion, biometric data, and so on. For example, the sensor(s) 410 may be an image sensor, a temperature sensor, a light or optical sensor, an accelerometer, a gyroscope, a magnet, a health monitoring sensor, and so on.

The network communication interface 412 can facilitate transmission of data to or from other electronic devices. For example, a network communication interface can transmit electronic signals via a wireless and/or wired network connection. For example, in one embodiment a communication signal is transmitted to a transmitter device and/or to a receiver device to permit the transmitter and receiver devices to communication with one another. Examples of wireless and wired network connections include, but are not limited to, cellular, Wi-Fi, Bluetooth, IR, Ethernet, and Near Field Communication (NFC).

The display 414 can provide a visual output to the user. The display 414 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 414 can function as an input device that allows the user to interact with the receiver device. For example, the display can be a multi-touch touchscreen display.

A transmitter device 418 may include some or all of the components shown in FIG. 4. As one example, the transmitter device 104 shown in FIG. 1 may include one or more processors 402, storage or memory 404, one or more input/output devices 406, a power source 408, one or more sensors 410, and a network communication interface 412. A transmitter device 418 in other embodiments can include fewer components and/or additional components. In some embodiments, a transmitter device can include a display.

Embodiments described herein provide various techniques for managing temperature in an inductive energy transfer system. The temperature of the transmitter device and/or the receiver device can be monitored, and various actions may be taken when the temperature of a device is too high (e.g., the temperature equals or exceeds a first temperature threshold). When the temperature is too high, the transmitter device can be turned off to allow the temperature to lower. When the temperature lowers to a second temperature threshold, the transmitter device can turn on and begin communicating with the receiver device.

Figure 5:
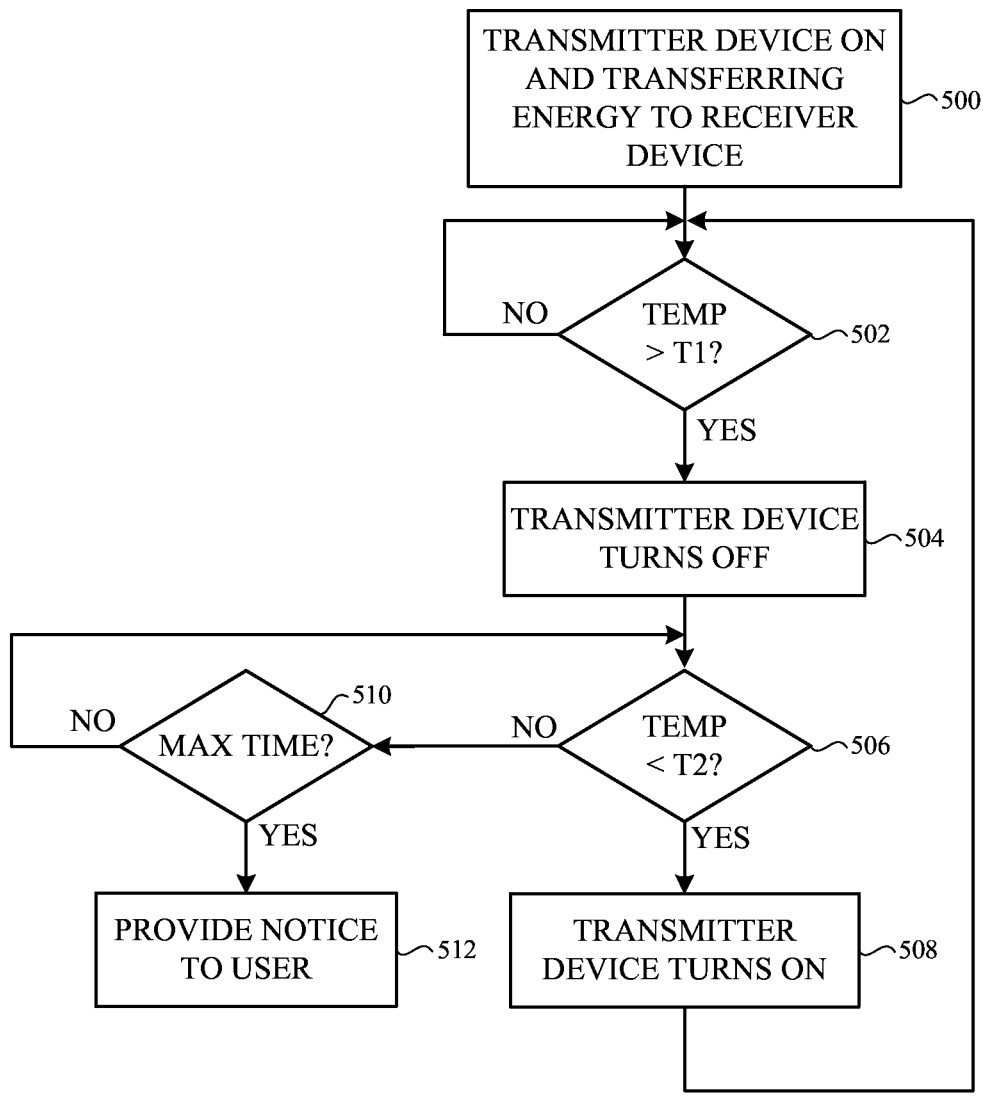
FIG. 5 is a flowchart of a first method of operating an inductive energy transfer system.

Referring now to FIG. 5, there is shown a flowchart of a first method of operating an inductive energy transfer system. Initially, a transmitter device is turned on and transferring energy to a receiver device (block 500). A determination is then made at block 502 as to whether or not the temperature of the transmitter device and/or the receiver device equals or exceeds a first temperature threshold value T1. If not, the transmitter device continues to transfer energy to the receiver device and the method waits at block 502.

If the temperature of the transmitter and/or receiver device equals or exceeds a first threshold value T1 at block 502, the process passes to block 504 where the transmitter device is turned off. A determination is then made at block 506 as to whether or not the temperature of the transmitter device equals or is less than a second temperature threshold value T2. In some embodiments, the second temperature threshold value T2 equals T1. In other embodiments, the second temperature threshold value T2 is less than T1.

If the temperature of the transmitter device equals or is less than the second temperature threshold value T2, the method continues at block 508 where the transmitter device is turned on. Once the transmitter device is turned on, the transmitter device can communicate with the receiver device, begin transferring energy to the receiver device, and/or perform a security or authentication procedure with the receiver device. The method then returns to block 502.

In the illustrated embodiment, as well as in other embodiments described herein, the need to perform an authentication procedure can be avoided if the transmitter device turns on within a grace period after turning off. For example, an authentication procedure may not be required if the transmitter device turns on within thirty to forty seconds after being turned off. In some embodiments, a low level handshaking procedure may be performed instead of an authentication process when the transmitter device turns on within the grace period.

Referring again to block 506, if the temperature of the transmitter device is greater than the second temperature threshold value T2, the process passes to block 510 where a determination is made as to whether or not an amount of time that the temperature has exceeded the second temperature threshold value T2 equals a maximum amount of time. If not, the method returns to block 506. If the amount of time that the temperature has exceeded the second temperature threshold value T2 equals the maximum amount of time, the process passes to block 512 where a notice is provided to the user. As one example, a transmitter device may be malfunctioning and the notice informs the user of the malfunctioning transmitter device.

Figure 6:
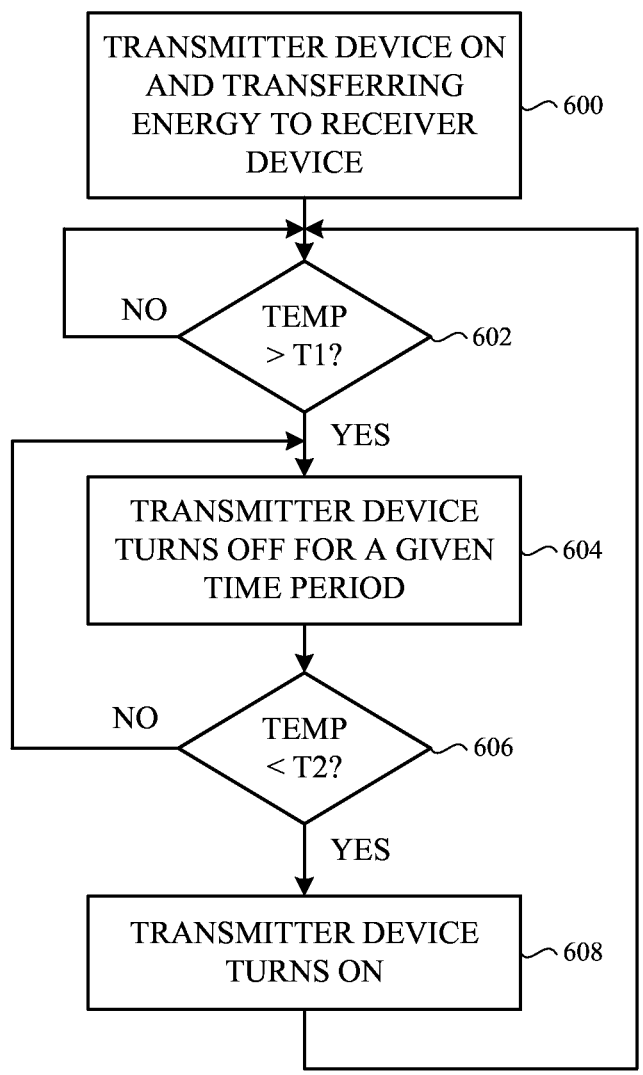
FIG. 6 is a flowchart of a second method of operating an inductive energy transfer system.

FIG. 6 is a flowchart of a second method of operating an inductive energy transfer system. Initially, a transmitter device is turned on and transferring energy to a receiver device (block 600). A determination is then made at block 602 as to whether or not the temperature of the transmitter device and/or the receiver device equals or exceeds a first temperature threshold value T1. If not, the transmitter device continues to transfer energy to the receiver device and the method waits at block 602.

If the temperature of the transmitter and/or receiver device equals or exceeds a first threshold value T1 at block 602, the process passes to block 604 where the transmitter device is turned off for a given period of time. The period of time may be any suitable amount of time. As one example, the transmitter device can be turned off for thirty seconds. Additionally, the period of time may be fixed, or the period of time may be adjustable based on one or more factors, such as prior thermal management actions, the difference between the current temperature and the first threshold value T1, and/or a communication signal received from the receiver device.

At the end of the given period of time, a determination is made at block 606 as to whether or not the temperature of the transmitter device equals or is less than a second temperature threshold value T2. As described previously, the second temperature threshold value T2 can equal T1 in some embodiments. In other embodiments, the second temperature threshold value T2 is less than T1.

The method returns to block 604 if the temperature of the transmitter device is greater than the second temperature threshold value T2, where the transmitter device remains turned off for another period of time. Again, as described earlier, the period of time may be fixed or adjustable. If the temperature of the transmitter device equals or is less than the second temperature threshold value T2, the process continues at block 608 where the transmitter device is turned on. Once on, the transmitter device can communicate with the receiver device, begin transferring energy to the receiver device, and/or perform a security or authentication process with the receiver device. The method then returns to block 602.

Figure 7:
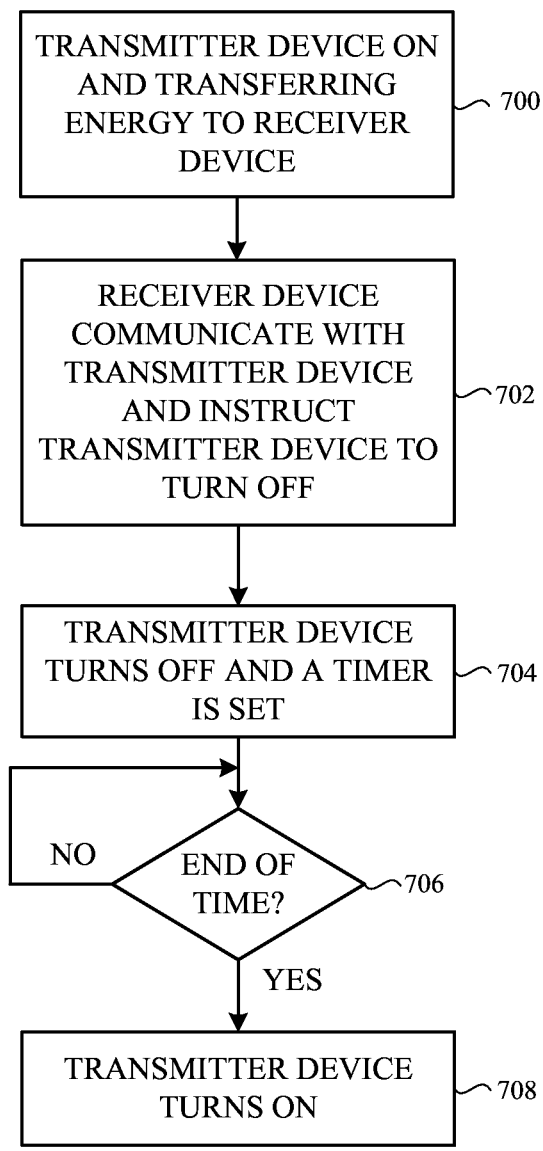
FIG. 7 is a flowchart of a third method of operating an inductive energy transfer system.

Referring now to FIG. 7, there is shown a flowchart of a third method of operating an inductive energy transfer system. Initially, a transmitter device is turned on and transferring energy to a receiver device (block 700). At some point during the energy transfer operation, the receiver device can transmit a communication signal to the transmitter device that instructs the transmitter device to turn off (block 702). As one example, the receiver device can detect or determine a temperature of the transmitter device equals or exceeds a temperature threshold value T1 and responsively transmit the communication signal to the transmitter device.

When the transmitter device receives the communication signal, the transmitter device turns off and a timer is set (block 704). The timer specifies an amount of time in which the transmitter device will be turned off. The timer may be set and maintained by the transmitter device in one embodiment. In another embodiment, the timer may be set and maintained by the receiver device. And in yet another embodiment, the timer may be set by one device (e.g., the receiver device) and maintained by the other device (e.g., the transmitter device).

Additionally, the amount of time the timer is set to can be fixed or adjustable. The amount of time may be adjustable based on one or more factors, such as prior thermal management actions, the difference between the current temperature and the first threshold value T1, and/or the communication signal received from the receiver device.

A determination is then made at block 706 as to whether or not the time on the timer equals zero. If not, the process waits at block 706. If the timer equals zero, the method passes to block 708 where the transmitter device is turned on. As discussed previously, the transmitter device can communicate with the receiver device, begin transferring energy to the receiver device, and/or perform a security or authentication process with the receiver device once the transmitter device is on.

Figure 8:
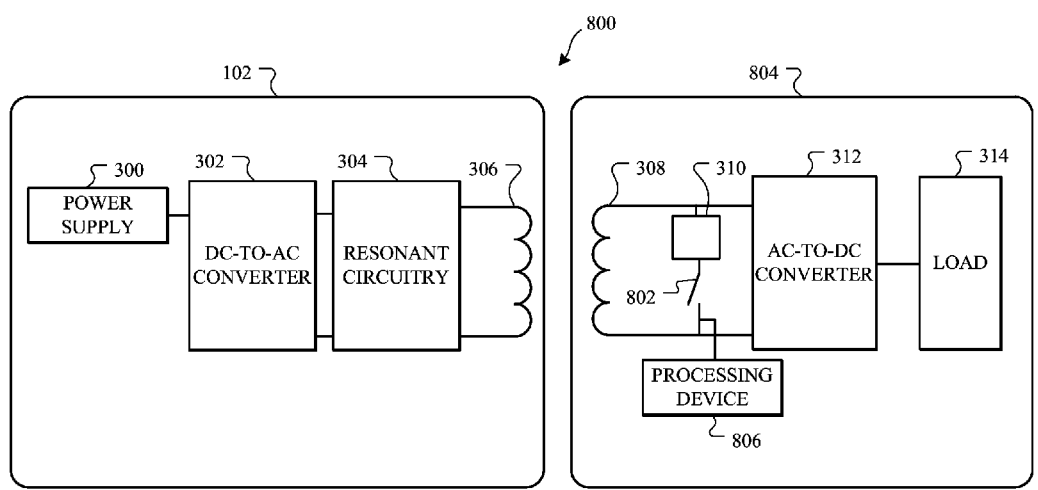
FIG. 8 is a simplified block diagram of a wireless energy transfer system suitable for performing the method shown in FIG. 7.

FIG. 8 is a simplified block diagram of a wireless energy transfer system suitable for performing the method shown in FIG. 7. The wireless energy transfer system 800 is similar to the embodiment of FIG. 3, with the addition of the switch 802 in the receiver device 804. Any suitable type of switch can be used. In some embodiments, a processor 806 can control the state of the switch 802 (i.e., open or closed). The functions of the processor 806 can be incorporated into the processor 402 (FIG. 4), or the processor 806 may be separate from the processor 402.

The switch 802 can be used by the receiver device 804 to communicate with the transmitter device 102. As one example, the switch can be opened when the receiver device 804 is to be "cloaked" or not in communication with the transmitter device 102, even when the receiver coil is able to couple with the transmitter coil (e.g., the receiver device is on the charging surface). As one example, the transmitter device 102 can transfer energy to the receiver device 804 to charge a battery (e.g., load 214) in the receiver device. The switch 802 is closed while the battery is charging. The switch can be opened when the temperature of the transmitter or receiver device is too high. The opened switch informs the transmitter device 102 to stop transferring energy, and the transmitter device 102 turns off in response to the open state of the switch 802.

Additionally or alternatively, the transmitter device 102 can turn on periodically to communicate with the receiver device 804. For example, the transmitter device may transmit a ping to the receiver device to communicate with the receiver device. A ping is a short burst of energy that is transferred to the receiver device 804. A ping can be transferred for a variety of reasons. For example, a transmitter device can transmit a ping to the receiver device to determine if the receiver device is present and/or is ready for energy transfer. The transmitter device 102 may transmit a ping and wait for a response from the receiver device 804. If no response is received, the transmitter device 102 typically waits for a given period of time before sending another ping. If a response is received, the transmitter device 102 can transfer energy to the receiver device 804 to charge a battery and/or to transmit one or more communication signals to the receiver device 804.

In some embodiments, a separate transmitter coil, receiver coil, or transformer may be included in the inductive energy transfer system and used to transmit a ping to the receiver device at a frequency that is different from the frequency of the energy transfer. In such embodiments, a second resonant circuit can be included in the receiver device to reduce the amount of power consumed by the transmitter coil when transmitting pings. The second resonant circuit can have a resonant frequency ($f_{R2}$) that is higher than the resonant frequency of the first resonant circuitry (e.g., resonant circuitry 304 in FIG. 3). The transmitter coil can be energized at the higher second resonant frequency when transmitting a ping and draw relatively low current when the inductance of the transmitter coil is low. At the higher second resonant frequency the impedance of the transmitter coil may be higher and the transmitter coil does not consume as much power when transmitting pings.

Additionally or alternatively, a network communication interface that is separate from the inductive energy transfer link may be used for communications between the transmitter device and the receiver device. As described in conjunction with FIG. 4 (see network communication interface 412), the transmitter and receiver devices may include one or more network communication interfaces (e.g., Bluetooth, IR, and Near Field Communication (NFC)). A network communication interface can be used as a communications mechanism for the transmitter and receiver devices during inductive energy transfer. As one example, the receiver device can instruct the transmitter device to turn off using a network communication interface. As another example, the transmitter device can inform the receiver device that it is turning off and/or turning on through a network communication interface. Additionally or alternatively, one device (e.g., the transmitter device) can transmit temperature and operational data to the other device using a network communication interface.

Figure 9:
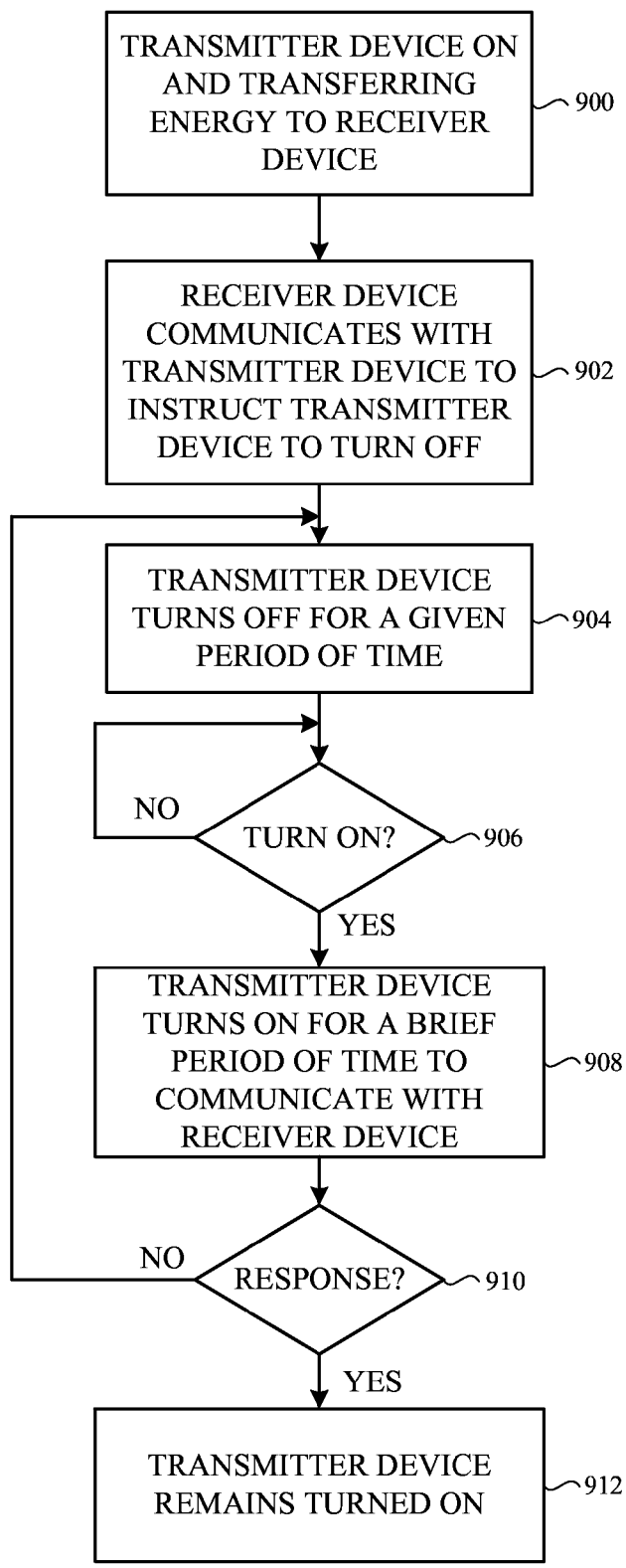
FIG. 9 is a flowchart of a fourth method of operating an inductive energy transfer system.
Figure 10:
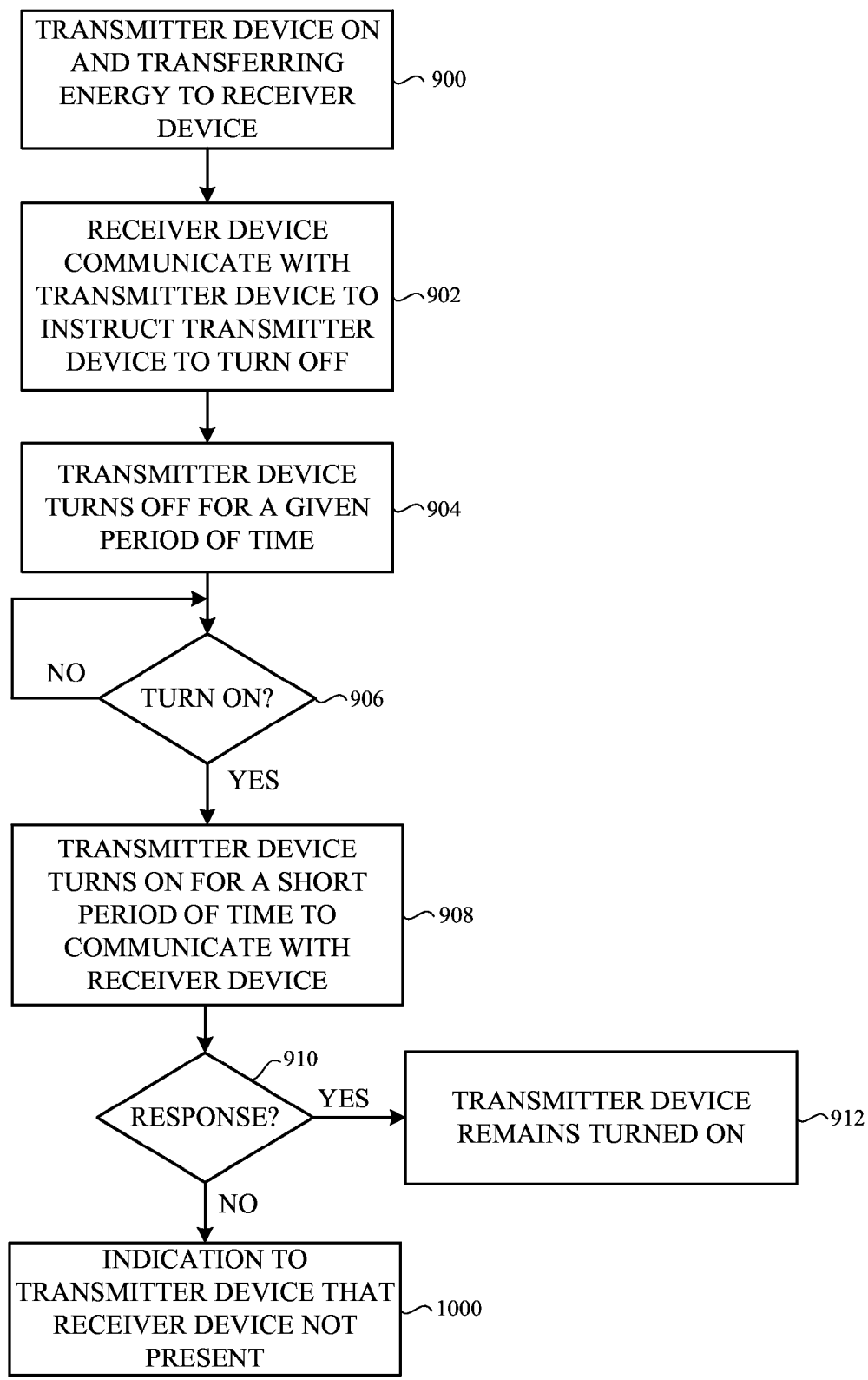
FIG. 10 is a flowchart of a fifth method of operating an inductive energy transfer system.

Referring now to FIG. 9, there is shown a flowchart of a fourth method of operating an inductive energy transfer system. Initially, a transmitter device is turned on and transferring energy to a receiver device (block 900). At some point during the energy transfer, the receiver device communicates with the transmitter device and indicates the transmitter device should turn off (block 902). The transmitter device then turns off for a given period of time (block 904). As described earlier, the period of time may be fixed, or the period of time may be adjustable based on one or more factors. Example factors include, but are not limited to, prior thermal management actions, the difference between the current temperature and the first threshold value T1, and/or a communication signal received from the receiver device.

Next, as shown in block 906, a determination is made as to whether or not the transmitter device is to turn on. If not, the process waits at block 906. If the transmitter device is to turn on, the method continues at block 908 where the transmitter device turns on for a brief period of time to communicate with the receiver device. For example, the transmitter device can turn on and transmit a ping or a communication on a separate network communication interface to the receiver device.

A determination is then made at block 910 as to whether or not the transmitter device received a response from the receiver device. If not, the method returns to block 904. If a response is received from the receiver device, the transmitter device can turn on at block 912. Once the transmitter device is turned on, the transmitter device can communicate with the receiver device, begin transferring energy to the receiver device, and/or perform a security or authentication process with the receiver device.

In some embodiments, the transmitter device can determine the receiver device is not present (e.g., not on a charging surface) when the transmitter device does not receive a response at block 910. This determination is shown in block 1000 in FIG. 10. Based on this determination, the transmitter device can take appropriate action. For example, the transmitter device can turn off for a longer period of time before transmitting another ping.

In some embodiments, the receiver device can include the switch 802 shown in FIG. 8, and the switch may be opened or closed to communicate with the transmitter device. As one example, the switch can be opened to inform the transmitter device to turn off at block 902. Additionally or alternatively, the switch can be opened when the receiver device does not want to provide a response to the communication received from the transmitter device at block 908.

Figure 11:
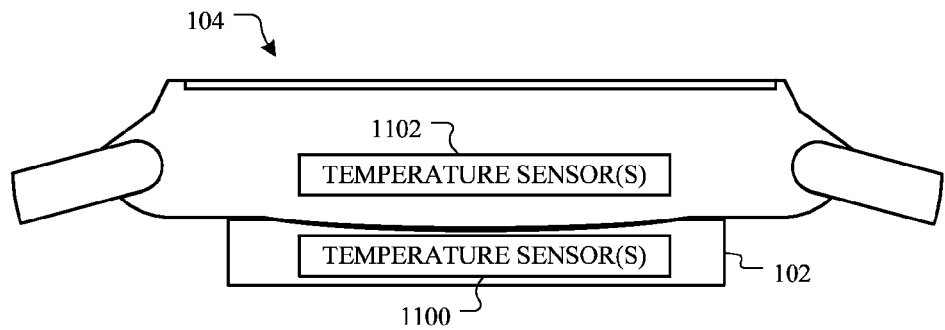
FIG. 11 is a simplified cross-section view of the inductive energy transfer system taken along line 11-11 in FIG. 2.

Referring now to FIG. 11, there is shown a simplified cross-section view of the inductive energy transfer system taken along line 11-11 in FIG. 2. As discussed earlier, both the transmitter device 102 and the receiver device 104 can include electronic, mechanical, and/or structural components. For example, both the receiver and the transmitter devices can include one or more processors, memory, a network communication interface, and one or more input/output devices. The illustrated embodiment of FIG. 11 omits the electronic, mechanical, and/or structural components for simplicity.

In some embodiments, one device (e.g., the receiver device) can receive data or information that assists the device in determining whether the temperature of the system is too high and the transmitter device should be turned off.

As one example, the transmitter device 102 and the receiver device 104 can each include one or more temperature sensors 1100, 1102, respectively. One example of a temperature sensor is a thermistor. The temperature sensor(s) 1100 in the transmitter device can sense the temperature of the transmitter device and the temperature sensor(s) 1102 in the receiver device can sense the temperature of the receiver device. The temperature of the transmitter device can be transmitted to the receiver device. Based on the sensed temperatures in the receiver and transmitter devices, the receiver device can determine that the transmitter device should be turned off. The receiver device may then instruct the transmitter device to turn off. For example, the receiver device can transmit a communication signal to the transmitter device, or the receiver device may open the switch 802 shown in FIG. 8 to instruct the transmitter device to turn off.

In other embodiments, the temperature of the receiver device can be transmitted to the transmitter device. Based on the sensed temperatures in the receiver and transmitter devices, the transmitter device can determine that the transmitter device should be turned off.

Figure 12:
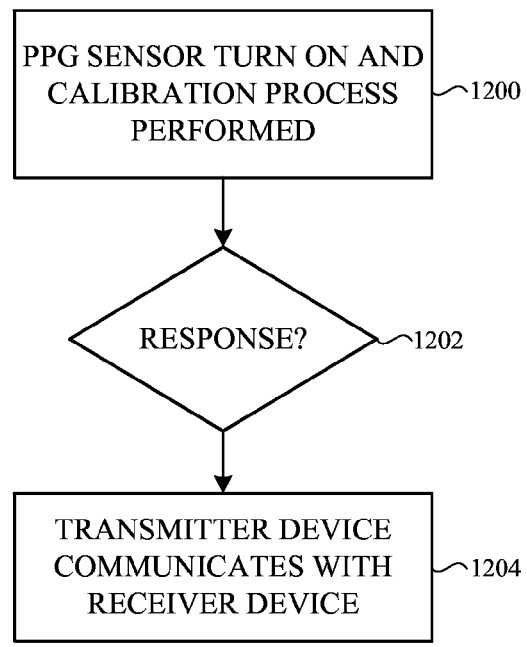
FIG. 12 is a flowchart of a sixth method of operating an inductive energy transfer system.

FIG. 12 is a flowchart of a sixth method of operating an inductive energy transfer system. As discussed previously, the receiver device can include one or more sensors of any type (see block 410 in FIG. 4). In one embodiment, the receiver device can include one or more photoplethysmogram (PPG) sensors. A PPG sensor can be used to determine if a transmitter device is off. In some embodiments, the PPG sensor may require less power to detect the absence of the transmitter device.

For example, while transferring energy to the receiver device, the transmitter device may turn off for a given period of time to allow the temperature of the transmitter device to decrease. While the transmitter device is turned off, the PPG sensor can turn on and perform a calibration procedure to determine if the transmitter device is present. The calibration procedure may be performed to determine if the values and settings expected during a calibration procedure are received and/or determined during the calibration procedure. If the received settings are different from the expected settings, a determination may be made that the transmitter device is not present.

Although embodiments are described with reference to turning off a transmitter device to manage the temperature of the transmitter device, embodiments can turn off or modify the operations of other devices in the transmitter or receiver device to manage the temperature of the transmitter device. Turning off or modifying the operations of other devices can occur simultaneously with turning off the transmitter device, prior to turning off the transmitter device, or after turning off the transmitter device. For example, in one embodiment, the brightness of a display can be dimmed, or the display may be turned off to assist in managing or reducing the temperature of the transmitter device. In another embodiment, a wireless communication device, such as Wi-Fi, cellular, or Bluetooth, may be turned off to assist in managing or reducing the temperature of the transmitter device. Additionally or alternatively, navigation systems such as GPS can be turned off. In yet another embodiment, the display screen timeout setting can be shortened so that the display remains lit for a shorter period of time after the display or electronic device receives an input. Additionally or alternatively, the vibrate function can be turned off to assist in managing or reducing the temperature of the transmitter device. These example embodiments can be implemented individually or in various combinations. Also, it is understood that these example embodiments are merely illustrative and that other functions or devices can be adjusted or turned off to assist in managing or reducing the temperature of the transmitter device.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

For example, in some embodiments, a transmitter device can be turned off based on a communication received from a receiver device and when the temperature of the transmitter and/or receiver device equals or exceeds a first threshold value. The communication may be sent to the transmitter device through a separate communication link and/or through the use of a switch included in the receiver device. The transmitter device may be turned off until a temperature of the transmitter device equals or is less than a second threshold value and/or the transmitter device may be turned off for a fixed or adjustable period of time.

What is claimed is:

1. A method for operating an inductive energy transfer system that includes a transmitter device and a receiver device, the method comprising:
  during energy transfer:
  determining, by the receiver device, whether a temperature of the transmitter device is equal to or greater than a first temperature threshold;
    if the temperature is equal to or greater than the first temperature threshold, sending a first signal from the receiver device to the transmitter device to disable a transmitter coil of the transmitter device;
    triggering, by the transmitter device, a turn-on timer after receiving the first signal;
    turning on the transmitter coil after the turn-on timer elapses;
    determining, by the receiver device, whether the temperature of the transmitter device is equal to or greater than a second temperature threshold; and
    if the temperature is equal to or greater than the second temperature threshold, sending a second signal to the transmitter device to disable the transmitter coil of the transmitter device.

2. The method as in claim 1, wherein a time between the turn-on timer triggering and elapsing comprises a fixed period of time.

3. The method as in claim 1, wherein a time between the turn-on timer triggering and elapsing comprises an adjustable period of time.

4. The method as in claim 3, wherein the time between the turn-on timer triggering and elapsing is adjusted based on one or more prior thermal management actions.

5. The method as in claim 3, wherein the time between the turn-on timer triggering and elapsing is adjusted based on a difference between a current temperature and the first temperature threshold value.

6. The method as in claim 1, wherein turning on the transmitter coil comprises:
  after the turn-on timer elapses, determining if the temperature of the transmitter device is equal to or less than a third temperature threshold; and
  if the temperature is equal to or less than the second temperature threshold, turning on the transmitter coil.

7. A method for operating an inductive energy transfer system that includes a transmitter device and a receiver device, the method comprising:
  disabling a the transmitter device based on a communication signal received from the receiver device in response to the receiver device determining that a temperature of the transmitter device is equal to or greater than a temperature threshold;
  transmitting, by the transmitter device, a ping to the receiver device; and
  turning on the transmitter device based on receiving a response from the receiver device.

8. The method as in claim 7, wherein disabling the coil of the transmitter device comprises disabling the coil of the transmitter device for a given period of time.

9. The method as in claim 7, further comprising:
  prior to disabling the coil of the transmitter device, transmitting, by the transmitter device, temperature data from the transmitter device so the receiver device can determine whether to disable the coil of the transmitter device.

10. The method as in claim 9, wherein the temperature data is obtained from a temperature sensor of the transmitter device.

11. The method as in claim 7, further comprising providing a notice to a user when the transmitting device is off.

12. The method as in claim 7, further comprising:
  in response to receiving the communication signal from the receiver device, triggering, by the transmitter device, a turn-on timer; wherein
  transmitting the ping to the receiver device occurs in response to the turn-on timer elapsing.

13. The method as in claim 7, wherein:
  the communication signal is a first communication signal;
  the temperature threshold is a first temperature threshold; and
  the method further comprises disabling the transmitter device based on a second communication signal received from the receiver device in response to the receiver device determining that the temperature of the transmitter device is equal to or greater than a second temperature threshold.

14. An inductive energy transfer system comprising:
  a transmitter device comprising:
    a first temperature sensor configured to determine a temperature of the transmitter; and
    a first network communication interface; and
  a receiver device comprising:
    a second network communication interface configured to communicate with the first network communication interface of the transmitter device; and
    a first processing device, wherein:
  during energy transfer, the first network communication interface is configured to transmit first temperature data obtained from the first temperature sensor to the second network communication interface;
  the first processing device is configured to:
    determine whether the transmitter device should be disabled based on the first temperature data; and
    cause the transmitter device to be disabled in response to determining that the temperature of the transmitter device is equal to or greater than a temperature threshold.

15. The inductive energy transfer system as in claim 14, wherein the receiver device comprises a second temperature sensor and the first processing device is configured to determine whether the transmitter device should be disabled based on second temperature data obtained from the second temperature sensor and the first temperature data received from the transmitter device.

16. The inductive energy transfer system as in claim 14, further comprising a third network communication interface in the receiver device transmitting a communication signal to a fourth network communication interface in the transmitter device and a second processing device in the transmitter device is configured to disable the transmitter device based on the communication signal.

17. The inductive energy transfer system as in claim 16, wherein the second and third network communication interfaces comprise the same network communication interface in the receiver device and the first and fourth network communication interfaces comprise the same network communication interface in the transmitter device.

18. The inductive energy transfer system as in claim 14, wherein the receiver device comprises a wearable communication device.

19. The inductive energy transfer system as in claim 14, wherein the receiver device further comprises a photoplethysmogram sensor configured to determine a presence or absence of the transmitter device when the receiver device is on an inductive charging surface of the transmitter device.

20. The method of claim 14, wherein:
the transmitter device further comprises a turn-on timer;
causing the transmitter device to be disabled in response to determining that the temperature of the transmitter device is equal to or greater than a temperature threshold triggers the turn-on timer; and
the transmitter device turns on after the turn-on timer elapses.

\* \* \* \* \*

UNITED STATES PATENT AND TRADEMARK OFFICE
CERTIFICATE OF CORRECTION

PATENT NO. : 10,014,733 B2
APPLICATION NO. : 14/837965
DATED : July 3, 2018
INVENTOR(S) : Heresztyn et al.

It is certified that error appears in the above-identified patent and that said Letters Patent is hereby corrected as shown below:

In the Specification

In Column 3, at Line 66, delete "FIGS. 1-16" and insert --FIGS. 1-12--.

Signed and Sealed this
Sixteenth Day of July, 2019

Andrei Iancu
*Director of the United States Patent and Trademark Office*